Inventor
John E. DeTurk
By W. R. Maltby
D. C. Snyder
Attorneys

Inventor
John E. DeTurk
By W. R. Maltby
D. E. Snyder
Attorneys 2,864,077

MEANS FOR DISTINGUISHING POSITIVE AND NEGATIVE PULSES IN MAGNETIC TAPE RECORDING

John E. De Turk, Ann Arbor, Mich., assignor, by mesne assignments, to the United States of America as represented by the Secretary of the Navy Application March 10, 1954, Serial No. 415,455

7 Claims. (Cl. 340—174)

The present invention relates generally to data storage equipment and more particularly to playback circuits for magnetic tape recording systems.

In digital computing equipment employing signal storage means, the numerical information is usually recorded as a sequence of magnetic spots or "cells" on a moving strip of magnetically retentive wire or tape. In such storage systems, it is customary to distinguish the binary states "1" and "0" by the direction of magnetic polarization of the spots recorded on the tape. For example, in the "three-level return" system of signal representation, the "1" is recorded by saturating a discrete area of the tape in one direction, the "0" is recorded by saturating the tape in the opposite direction, and the "no signal" condition is designated by an absence of magnetization. However, each of these magnetized spots, when scanned by the reading head during the playback cycle, produces a voltage wave form containing both positive and negative excursions. Since the electromotive force induced in the output winding of the recording head is proportional to the rate of change of the magnetic flux in the core, each output signal exhibits a transition from a positive to a negative polarity, or vice versa, at the approximate center portion of each cell, for at this time the flux in the core is at a constant maximum or minimum level. These full wave voltage pulses cannot be directly utilized because their composite characteristics result in spurious operation of the computing circuits.

It is, accordingly, a primary object of the present invention to provide a playback circuit for a pulse storage system of the magnetic type which will give a definite indication of the precise nature of the individual coded pulses recorded in the magnetic storage medium.

A secondary object of the present invention is to provide a circuit arrangement for distinguishing the polarities of different magnetization spots along a recording track so that the information represented thereby may be readily utilized in computing equipment.

A still further object of the present invention is to provide a playback circuit for use in magnetic recording systems wherein a single well-defined output pulse is produced at the precise instant the recorded binary code element passes the pole pieces of the read-out head.

A still further object of the present invention is to provide a circuit arrangement for use in magnetic tape recording systems which will generate a single output pulse of a polarity indicative of the direction of polarization of the magnetization spots recorded in the storage medium.

Other objects and many of the attendant advantages of this invention will be readily appreciated as the same becomes better understood by reference to the following detailed description when considered in connection with the accompanying drawings wherein.

Figure 1:
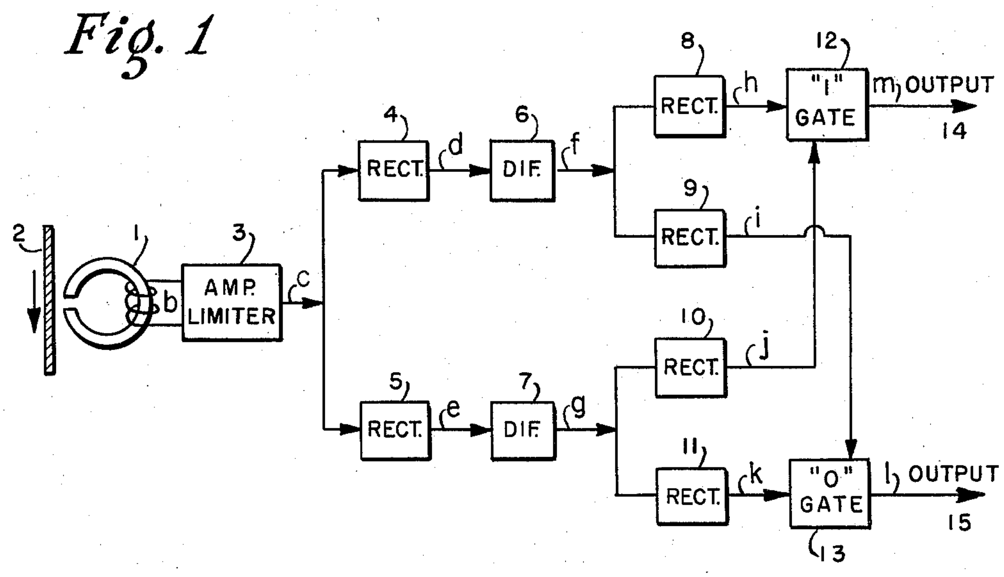
Fig. 1 is a box diagram of a preferred embodiment of the present invention.

Referring now to Fig. 1, a magnetic tape member capable of linear movement past a conventional ring-type recording head 1, by means not shown, is generally represented by reference character 2. For purposes of the following description, it will be assumed that a binary code sequence corresponding to digits 1 0 1 has been previously recorded on tape member 2. For such a code sequence, both the intensity of magnetization plotted against linear distance along the tape and the flux in the core of the reading head plotted against time, correspond approximately to curve *a* of Fig. 2. The flux in the core remains at a given level with no signal present in the tape and shifts momentarily to a maximum or minimum in response to the scanning of magnetization spots corresponding to binary code elements "1" and "0," respectively. The electromagnetic force developed in the output winding of reading head 1, which is equal to the product of the time derivative of the flux times the number of turns of this winding is shown by curve *b* of the above figure. It would be pointed out that these curves have their horizontal time axis scale considerably expanded to facilitate the following explanation of the operation of the system. It will be seen from an examination of the wave forms of curve *b* that each recorded magnetization spot, regardless of its particular direction of polarization, generates in the recording head a full wave pulse, i. e., a leading half cycle of positive polarity followed by a trailing half cycle of negative polarity in the case of binary code element "1" and a leading half cycle of negative polarity followed by a trailing half cycle of positive polarity in the case of binary code element "0." Hence, the specific nature of the binary code elements recorded in the magnetic storage medium can be determined only by examining the order in which the above half cycles occur.

In accordance with the present invention, the above full wave voltage pulses are first amplified and limited in circuit 3, to give the flat-topped pulses of curve *c*, and then applied to a pair of rectifiers, 4 and 5, the function of which is to separate the positive half cycles from their negative counterparts. To achieve this separation, rectifier 4 is poled to pass positive pulses and rectifier 5 is poled to pass only negative pulses. The signals appearing in the output circuits of these rectifiers are shown in curves *d* and *e*. Thereafter, both pulses are differentiated by appropriate RC networks, 6 and 7, the resulting derivative voltages corresponding to the wave forms in curves *f* and *g*. Each peaked pulse so derived delineates either the leading or trailing edge of a squared pulse in curves *d* and *e*. The outputs of these differentiators are next fed to rectifiers 8, 9, 10 and 11 and again the positive pulses are separated from the negative pulses, as shown in curves *h*, *i*, *j* and *k*. The output pulses from the positively connected rectifiers, 8 and 10, provide the input signals for coincidence gate 12, while the output pulses from the negatively connected rectifiers, 9 and 11, supply the input signals for coincidence gate 13. Each of these gates is sensitive only to pulses of a particular polarity and operates only when both of its input circuits are simultaneously energized, as indicated by curves *l* and *m*.

Figure 2:
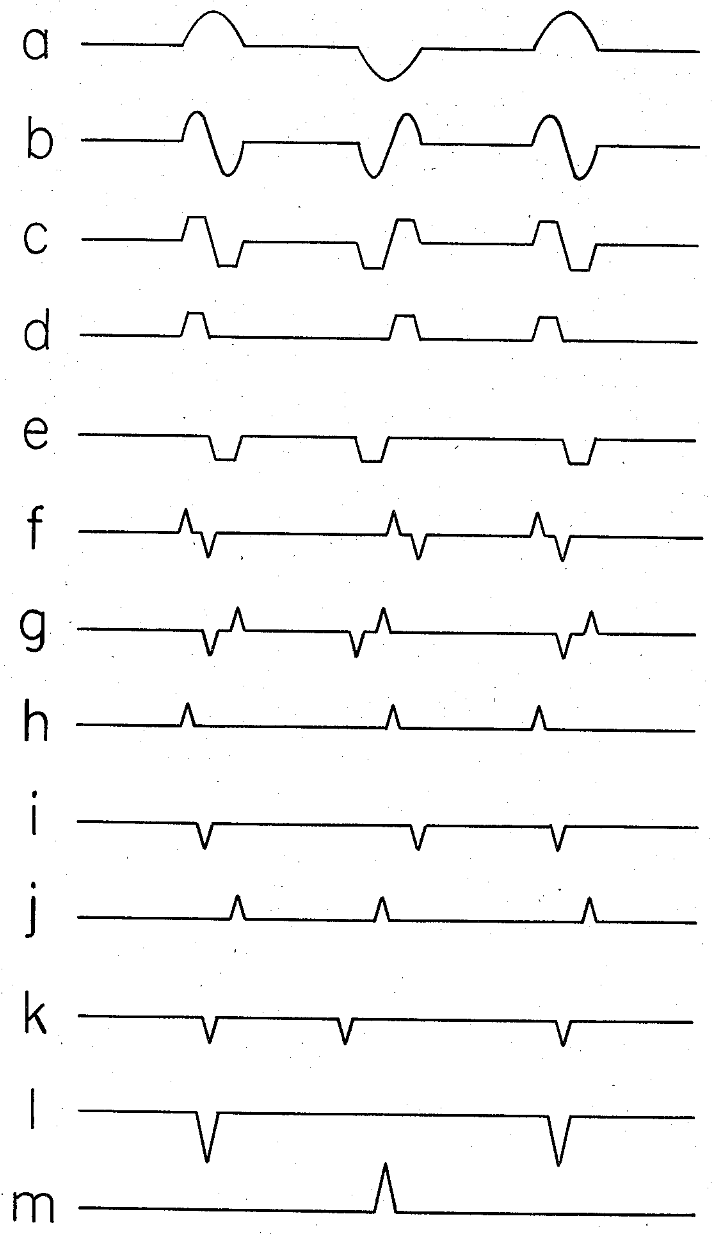
Fig. 2 is a family of curves plotted to the same horizontal time scale showing the different wave forms existing in the system of Fig. 1 for a definite code sequence stored in the magnetic tape.

It will be seen from an examination of the curves of Fig. 2 that positive coincidence gate 12 is activated only once for the above sequence of binary code elements and that its time of activation corresponds to the midpoint of magnetization spot 38 representing the "0" digit. At this time, the positive peaked pulse 41, defining the trailing edge of negative half cycle 39, coincides substantially with the positive peaked pulse 42, delineating the leading edge of the complementary positive half cycle 40. The presence of these two positive pulses satisfies the operational requirements of gate 12 and, consequently, a single positive output pulse 43 is produced at terminal 14.

It will also be seen from an examination of the above curves that in response to the above code sequence, gate 13 operates twice, once for each "1" recorded in the magnetic storage medium. Here, too, the conditions necessary for operating the coincidence gate occur at the midpoints of the magnetization spots. At these times, negative pulses 44 and 47 in line *i* coincide with negative pulses 45 and 48 in line *k*. The above circuit therefore produces a single output pulse at the transitional point of each full wave voltage pulse, whose polarity is indicative of the direction of magnetic polarization of the code element being read.

Figure 3:
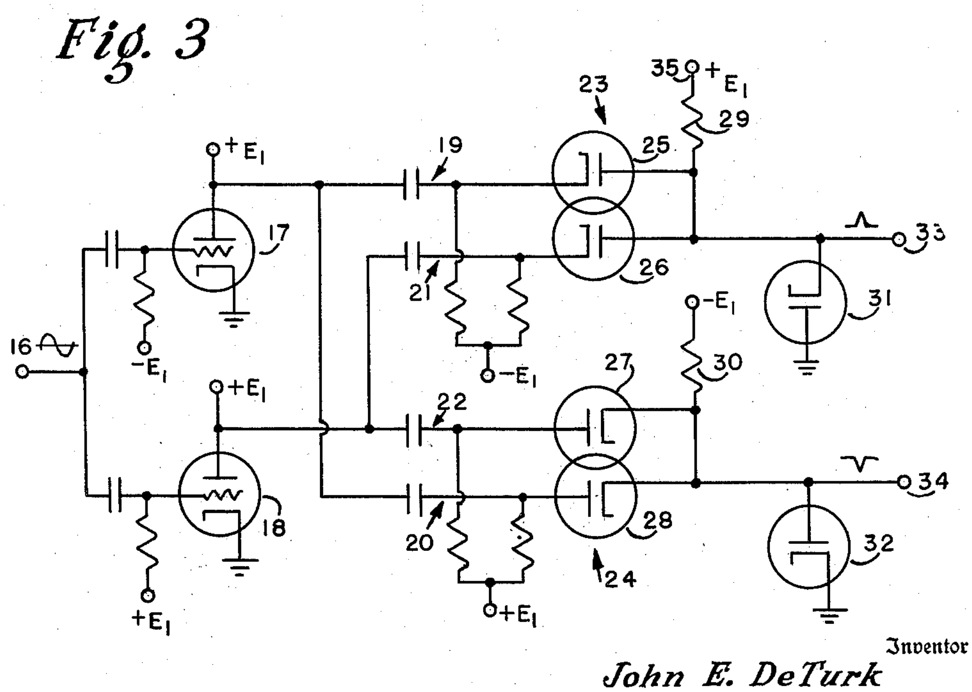
Fig. 3 is a schematic diagram of a typical circuit capable of performing the various functions and operations indicated in the box diagram of Fig. 1.

Fig. 3 shows a schematic circuit capable of performing the necessary operations required by the box diagram of Fig. 1. Triode 17 serves as a rectifier and limiter for positive pulses since its control grid is biased to cut-off by a local negative battery and responds only to the positive half cycle excursions of the applied signals coupled to input terminal 16. Triode 18 is maintained in a fully conductive status by a local positive battery and performs the same operations on negative pulses coupled to its control grid.

The output of triode 17 is fed to RC differentiating networks 19 and 20, while the output of triode 18 is fed to similar differentiating circuits 21 and 22. Associated with networks 19 and 21 is a coincidence gate for positive pulses generally represented by reference character 23. A similar coincidence gate for negative pulses, reference character 24, is connected to the output circuits of networks 20 and 22. Since these gates are sensitive only to applied pulses of a particular polarity, as will be seen hereinafter, the need for the rectifiers 8, 9, 10 and 11 of Fig. 1 is here obviated.

Diodes 25 and 26 of gate 23 have their anodes coupled via resistor 29 to the positive terminal of voltage source 35 and their cathodes connected via the resistive elements of the associated RC networks to the negative terminals of this source. Consequently, both of these tubes are normally maintained conducting. These tubes, in conjunction with the above resistors, constitute a voltage dividing network which maintains a predetermined reference potential at output terminal 33. The circuit parameters of the various elements included in gate 23 are selected so that output terminal 33 is held normally at approximately ground potential. Diode 31 acts as a clamp and prevents the output voltage from going negative whenever negative peaked pulses are applied to the cathodes of the above diodes.

If a positive peaked pulse appears at the cathode of one of these diodes, for example, at that of diode 25, the voltage rise at terminal 33 is held to an insignificant amount because of the continued conduction of the other diode 26. The latter provides a relatively low impedance path for the current flowing in the above voltage dividing network, and, therefore, the voltage at terminal 33 remains near ground potential. When both cathodes are supplied with positive pulses, however, the resulting blockage of diodes 25 and 26 permits terminal 33 to rise to approximately the voltage of potential source 35, and a positive output pulse is produced at this terminal.

Coincidence gate 24 functions in essentially the same manner, but due to the reversed connections of its diodes. elements 27 and 28, only negative input pulses affect its operation. Diode 32 performs in this circuit as a clamping tube and prevents the appearance of any positive output pulses at terminal 34.

The operation of the circuit of Fig. 3 will now be set forth. For this purpose, it will be assumed that the input signal present at terminal 16 is a full wave voltage pulse consisting of a positive half cycle followed by a negative half cycle, representing the binary code element "1." The leading positive half cycle of this pulse is absorbed by tube 18 and inverted by tube 17. The resulting negative pulse present in the output circuit of the latter tube is transformed by differentiating networks 19 and 20 into a pair of peaked pulses, the first of which is of a negative nature and the second of which is of a positive nature.

The aforementioned negative pulse produces no visible effect in the output circuits of gates 23 and 24 because of the clamping action of diode 31 and the continued conduction of diode 27. The positive peak pulse following this pulse, however, momentarily blocks diode 25 and conditions gate 23 for operation. Since this positive pulse occurs at the trailing edge of the positive half cycle of the full wave input pulse at terminal 16, its appearance marks the commencement of the leading edge of the complementary negative half cycle of this same input pulse. Triode 18 inverts this negative half cycle and differentiating circuits 21 and 22 transform it into a pair of spaced peaked pulses consisting of a positive pulse followed by a negative pulse. This second positive peaked pulse is thus available at the cathode of diode 26 of the same time the aforementioned positive pulse occurs at the cathode of diode 25. Diodes 25 and 26 are, therefore, transferred from a conducting to a nonconducting status and a positive output pulse appears at terminal 33. Since both of these positive peaked pulses occur at substantially the midpoint of the full wave input pulse, the operation of gate 23 coincides with the midportion of the magnetization spot being scanned at the recording head. Thus, the single output pulse is in time coincidence with the transitional portion of the full wave input pulse at terminal 16. The negative peaked pulse produced after this second positive pulse has no effect on gates 23 and 24 due to the performance of clamp 31 and diode 28. By a similar method of analysis, it can be shown that in the case of a binary code element "0" where the input signal at terminal 16 consists of a negative half cycle followed by a positive half cycle, gate 24 operates at the midportion of this code element and a single, well-defined negative pulse is produced at terminal 34. Thus, the circuit arrangement of Fig. 3 produces either a single output pulse of positive sign at terminal 33 or a single pulse of negative sign at terminal 34, depending upon the direction of magnetic polarization of the spot recorded on the magnetic tape.

Obviously many modifications and variations of the present invention are possible in the light of the above teachings. It is therefore to be understood that within the scope of the appended claims the invention may be practiced otherwise than as specifically described.

What is claimed is:

1. In combination with a magnetic storage member having finite areas of its surface magnetically polarized in a first or second direction to represent binary code elements, means for scanning said surface to produce full wave voltage pulses, said full wave voltage pulses commencing with either positive or negative half cycles depending upon the direction of magnetic polarization of the area being scanned, means for separating the positive half cycles of said full wave pulses from their complementary negative half cycles, means for differentiating said positive and negative half cycles whereby positive peaked pulses occurring at the leading edges of said positive half cycles and the trailing edges of said negative half cycles and negative peaked pulses occurring at the trailing edges of said positive half cycles and the leading edges of said negative half cycles are produced and means responsive to the simultaneous occurrence of two positive peaked pulses or two negative peaked pulses for generating a single output signal.

2. In combination with a magnetic storage member having finite sections of its surface magnetically polarized in different directions to represent binary code elements, a magnetic reading head for scanning said member to produce full wave voltage pulses for each of said sections, said full wave pulses commencing with either a positive or negative half cycle, depending upon the direction of polarization of the section being scanned, means for separating the positive half cycles of said full wave voltage pulses from their complementary negative half cycles, means for differentiating said positive and negative half cycles whereby first and second pairs of peaked pulses of opposite polarity are produced and means for producing a single positive output signal whenever a positive peaked pulse of said first pair coincides in time with a positive peaked pulse of said second pair and a single negative output signal whenever a negative peaked pulse of said first pair coincides in time with a negative peaked pulse of said second pair.

3. In combination with a magnetic storage member having finite areas of its surface magnetically polarized in a first or second direction to represent binary code elements, means for scanning said member to produce full wave voltage pulses, said full wave voltage pulses commencing with either a positive or negative half cycle depending upon the direction of magnetic polarization of the particular area being scanned, rectifying means for segregating the positive half cycles of said full wave pulses from their complementary negative half cycles, means for differentiating said positive and negative half cycles whereby first and second pairs of peaked pulses of opposite polarity are produced, a first coincidence circuit responsive to positive pulses, a second coincidence circuit responsive to negative pulses, and means for applying said first and second pairs of peaked pulses to said coincidence circuits whereby said first circuit operates to produce a positive output signal whenever a positive peaked pulse of said first pair coincides in time with a positive peaked pulse of said second pair and whereby said second circuit operates to produce a negative output signal whenever a negative peaked pulse of said first pair coincides in time with a negative peaked pulse in said second pair.

4. In combination with a magnetic storage member having finite portions of its surface magnetically polarized in different directions to represent different binary digits, means for scanning said surface with a magnetic reading head whereby full wave voltage pulses are produced, said full wave pulses having either a positive or negative leading half cycle depending upon the direction of polarization of the area being scanned, a pair of oppositely poled rectifiers for separating the positive half cycles of said full wave pulses from their complementary negative half wave cycles, a plurality of RC networks for differentiating said positive and negative half cycles, a first gate circuit requiring the presence of at least two positive peaked pulses in its input circuits as a condition for operation, a second gate circuit requiring the presence of at least two negative peaked pulses in its input circuits as a condition for operation, and means for coupling said first and second pairs of peaked pulses to said coincidence circuits whereby one or the other of these circuits is caused to operate depending upon the direction of magnetic polarization of the area being scanned.

5. In combination with a magnetic storage member having finite areas of its surface magnetically polarized in a first or second direction to represent binary code elements, means for scanning said surface to produce full wave voltage pulses, said full wave pulses commencing with either a positive or negative half cycle depending upon the direction of magnetic polarization of the area being scanned, means for segregating the positive half cycles of said full wave pulses from their complementary negative half cycles, means for differentiating said positive half cycles whereby first pairs of spaced peaked pulses of opposite polarity are produced, means for differentiating said negative half cycles whereby second pairs of spaced peaked pulses of opposite polarity are produced and means for generating an output signal whenever peaked pulses of said pairs having the same polarity occur simultaneously.

6. In an arrangement as defined in claim 5 wherein said means for generating an output signal includes a positive coincidence gate having first and second diodes, a resistor connected in the anode circuits of said diodes, a voltage source having its positive terminal connected to one end of said resistor and its negative terminal connected to the cathodes of said diodes, input circuits connected to said cathodes and a clamp tube connected between the anodes of said diodes and a reference potential, the output signal being taken from the anodes of said diodes.

7. In an arrangement as defined in claim 5 wherein said means for generating an output signal includes a negative coincidence gate having first and second diodes, a resistor connected in the anode circuits of said diodes, a voltage source having its negative terminal connected to one end of said resistor and its positive terminal connected to the anodes of said diodes, input circuits connected to said anodes, a clamping diode connected between said cathodes and a reference potential and an output connection coupled to the cathodes of said diodes.

References Cited in the file of this patent

UNITED STATES PATENTS

| | | |
|---|---|---|
| 2,424,961 | Bancroft | Aug. 5, 1947 |
| 2,552,013 | Orpin | May 8, 1951 |
| 2,557,729 | Eckert | June 19, 1951 |
| 2,632,845 | Goldberg | Mar. 24, 1953 |
| 2,670,445 | Felker | Feb. 23, 1954 |
| 2,675,427 | Newby | Apr. 13, 1954 |
| 2,704,361 | Pouliart et al. | Mar. 15, 1955 |
| 2,764,463 | Lubkin et al. | Sept. 25, 1956 |